(12) United States Patent
Muramatsu et al.

(10) Patent No.: US 10,773,155 B2
(45) Date of Patent: Sep. 15, 2020

(54) GAME MACHINE CONTROLLER

(71) Applicant: HORI CO., LTD., Yokohama-shi, Kanagawa (JP)

(72) Inventors: Hiroaki Muramatsu, Yokohama (JP); Koichiro Amano, Yokohama (JP); Yoshinori Konishi, Yokohama (JP)

(73) Assignee: HORI CO., LTD., Yokohama-shi, Kanagawa (JP)

( * ) Notice: Subject to any disclaimer, the term of this patent is extended or adjusted under 35 U.S.C. 154(b) by 58 days.

(21) Appl. No.: 16/086,656

(22) PCT Filed: Mar. 29, 2017

(86) PCT No.: PCT/JP2017/013064
§ 371 (c)(1),
(2) Date: Sep. 20, 2018

(87) PCT Pub. No.: WO2018/179180
PCT Pub. Date: Oct. 4, 2018

(65) Prior Publication Data
US 2020/0061455 A1    Feb. 27, 2020

(51) Int. Cl.
*A63F 13/23* (2014.01)
*A63F 13/24* (2014.01)
*G06F 3/0354* (2013.01)

(52) U.S. Cl.
CPC .............. *A63F 13/23* (2014.09); *A63F 13/24* (2014.09); *G06F 3/03543* (2013.01); *A63F 2300/1043* (2013.01)

(58) Field of Classification Search
CPC ....... A63F 12/23; A63F 13/24; G06F 3/03543
See application file for complete search history.

(56) References Cited

U.S. PATENT DOCUMENTS

| | | | |
|---|---|---|---|
| 8,267,786 B2 * | 9/2012 | Ikeda | A63F 13/06 463/37 |
| 2011/0263328 A1 * | 10/2011 | Yamashita | A63F 13/213 463/36 |
| 2018/0161670 A1 * | 6/2018 | Boev | A63F 13/24 |

OTHER PUBLICATIONS

Kevin Kenson, "The PS4 Mouse Controller", Jan. 27, 2019, YouTube, https://www.youtube.com/watch?v=2lqNVa5vjUA (Year: 2019).*

* cited by examiner

*Primary Examiner* — William H McCulloch, Jr.
*Assistant Examiner* — Ankit B Doshi
(74) *Attorney, Agent, or Firm* — Bednarek Legal, PLLC

(57) ABSTRACT

A game machine controller, which is used in combination with a mouse and is connected to a game machine to be used is improved so that a user is free from feeling strange about its input.

As illustrated in FIG. 6 (A), a game machine controller (1) and a mouse (2) are connected to a game machine (3) via an output cable (172) and a mouse cable (210), respectively. A signal output from the game machine controller (1) to the game machine (3) is a keyboard control signal generally output from a keyboard to the game machine (3). With this, the game machine (3) recognizes the game machine controller (1) as the keyboard. As a result, the game machine (3) receive and recognize WASD input in a vertical or horizontal direction from the game machine controller (1) and input from the mouse (2) in a direction that is not limited to the vertical or horizontal direction.

8 Claims, 6 Drawing Sheets

GAME MACHINE CONTROLLER

This application is a United States National Phase filing of PCT/JP2017/013064, having an International filing date of Mar. 29, 2017. These applications are hereby incorporated by reference in their entirety.

TECHNICAL FIELD

The present invention relates to a game machine controller configured to give input to, for example, a game machine.

BACKGROUND ART

Hitherto, a video game (hereinafter sometimes simply referred to as "game") has been widely used. A user enjoys a video game by using some kind of device (platform). There are various kinds of platforms for executing a video game, such as a game console, a general-purpose personal computer, a handheld game console, a cell phone, a smartphone, and a game machine installed in an amusement facility, for example, a video arcade.

All those platforms are included in the definition of the "game machine" as used in the invention of the subject application. However, representative examples of the game machine in the subject application are a game console and a general-purpose personal computer, which have a computer program for executing a video game installed therein.

Examples of the game console are PlayStation 4 (trademark) manufactured and distributed by Sony Interactive Entertainment Inc. and Xbox One (trademark) manufactured and distributed by Microsoft Japan Co., Ltd. In those game machines, a dedicated genuine controller is usually attached or sold separately, and a user enjoys a game by usually using the genuine controller. Genuine controllers were once provided in various designs, but a dominant design thereof is now established to some extent. A dedicated genuine controller in the dominant design includes an oblong body to be grasped by both hands, whose left half includes a directional pad allowing, for example, digital input, and a stick input device allowing, for example, analog input based on a tilt direction thereof, and whose right half includes four push buttons and such a stick input device as described above.

When the genuine controller of a game console is used, the almost de facto standard causes a directional pad (in other cases, four push buttons arranged vertically and horizontally, for example) to give input in a vertical or horizontal direction, and a stick input device to give input in a direction that is not limited to the vertical or horizontal direction. Other types of input are implemented by, for example, a push button, but input in the vertical or horizontal direction and input in a direction that is not limited to the vertical or horizontal direction are considered to be substantially indispensable.

Meanwhile, a user of a game executed on a general-purpose personal computer has a wide variety of options of the controller.

Some users of a game executed on a general-purpose personal computer use a game machine controller dedicated for playing a game, which has inherited the dominant design of the genuine controller of a game console. Such a game machine controller can be connected to a personal computer as a matter of course, and, similarly to the case of using the genuine controller of a game console, allows input in the vertical or horizontal direction via a directional pad and allows input in a direction that is not limited to the vertical or horizontal direction via a stick input device.

On the other hand, when a game is executed on a general-purpose personal computer, other users give input by using a keyboard and a mouse, which are generally used at the time of, for example, input of characters, in combination on the general-purpose personal computer. In this case, in general, the keyboard (keys of "W", "A", "S", and "D" of keyboard are assigned with inputs of up, left, down, and right in many cases, respectively, although this configuration may be changed depending on preference of user. Such input method is referred to as "WASD input" in subject application, which is commonly used term) is used to give input in the vertical or horizontal direction described above, which is given via the directional pad in the genuine controller of a game console, and the mouse is used to give input in a direction that is not limited to the vertical or horizontal direction described above, which is given via the stick input device in the genuine controller of a game console.

SUMMARY OF INVENTION

Technical Problem

Under such circumstances, there is a certain level of demand for using the game machine controller and the mouse in combination among users who enjoy a game on a general-purpose personal computer. Such users are not necessarily inexperienced in using the keyboard for WASD input, but some users who are accustomed to using the game machine controller desire to give input in the vertical or horizontal direction via the directional pad of the game machine controller, and give input in a direction that is not limited to the vertical or horizontal direction described above with the mouse allowing more accurate input than the stick input device of the game machine controller.

Such desires of users may look trivial, but in consideration of a characteristic of a game (or game machine) being luxury goods for having fun and being useless when use of the game (or game machine) causes stress, it can be understood that such desires of users are not trivial issues. At least a part of those users strongly desires implementation of using the game machine controller and the mouse in combination.

For example, in an FPS game (first person shooter/first person shooting game/action game in which world or space is represented as images from viewpoint of main character, and main character can move freely in world or space to fight using, for example, arm or bare hands), there is widely used an input method of moving the main character through input in the vertical or horizontal direction, and adjusting the arm's sight through input in a direction that is not limited to the vertical or horizontal direction. Some users enjoying such an FPS game strongly desire implementation of the input described above.

However, under the current circumstances, the desire of the user described above is not satisfied completely.

The desire of a certain user to connect the game machine controller and the mouse to a general-purpose personal computer to use those components is not satisfied for the following reason.

In general, a general-purpose personal computer can receive only one of input from the keyboard and mouse and input from the game machine controller, and when both of the game machine controller and the mouse are connected to the general-purpose personal computer, input from the game machine controller is prioritized and input from the mouse is not received. The reason for occurrence of such ignorance of input from the mouse is that a game machine (or computer program for causing general-purpose personal computer to function as game device) implemented by the general-purpose personal computer is designed on the assumption that the game machine controller always or definitely gives both of input in the vertical or horizontal direction and input in a direction that is not limited to the vertical or horizontal direction described above. That is, in order to prevent occurrence of a problem, for example, erroneous input, when the game machine "recognizes that the connected controller is a game machine controller", the game machine does not receive input from the mouse, which collides with input in a direction that is not limited to the vertical or horizontal direction from the stick input device, based on the assumption that the game machine controller always gives input in the vertical or horizontal direction and input in a direction that is not limited to the vertical or horizontal direction.

When both of the keyboard and the mouse are connected to the game machine, the game machine receives both of input in the horizontal or vertical direction from the keyboard and input in a direction that is not limited to the horizontal or vertical direction from the mouse without incurring the problem described above.

Meanwhile, there are some game machine controllers allowing connection to the mouse. Such a game machine controller is connected to a general-purpose personal computer to be used, and allows input from the mouse connected to the game machine controller to be transmitted to the general-purpose personal computer serving as a game machine via the game machine controller. Such a game machine controller including a directional pad gives input in the vertical or horizontal direction via the directional pad, and can convert input in a direction that is not limited to the vertical or horizontal direction from the mouse into input equivalent to that from a stick input device included in the controller. With this, this kind of the game machine controller can give input from the directional pad and input from the mouse to the general-purpose personal computer as if the input from the directional pad and the input from the mouse were those from the directional pad and the stick input device of the game machine controller, respectively. In this case, the game machine recognizes that the game machine controller is connected as a controller, and recognizes input from the mouse as input from the stick input device of the game machine controller. With such a system, the user can connect the game machine controller and the mouse to the general-purpose personal computer to use those components.

However, such a game machine controller also has a problem. Specifically, the game machine controller is required to convert input from the mouse into a signal equivalent to input from the stick input device in the game machine controller. The user may feel strange about a small amount of time required for such conversion and unnaturalness of the conversion.

The subject application has an object to improve a game machine controller, which can be used in combination with a mouse and is connected to a game machine to be used, so that a user does not feel strange about its input.

Solution to Problem

The inventors of the subject application propose the following invention in order to achieve the above-mentioned object.

One embodiment of the invention of the subject application is a game machine controller. The game machine controller is to be used in combination with a game machine having a function of executing a game and including a game machine input terminal. The game machine is configured to selectively receive, by the game machine input terminal, as input for executing the game, any one of: a controller control signal, which is input from the game machine controller and is recognized as a signal from the game machine controller; and a keyboard control signal, which is input from a keyboard or a mouse and is recognized as a signal from the keyboard or the mouse. The game machine may be, for example, a game machine (general-purpose personal computer capable of executing video game), which is configured by installing a computer program for executing a game into a general-purpose personal computer, or a game console.

The game machine controller includes: a first input device configured to give input in a vertical or horizontal direction through an operation thereof; first signal generation means for generating a first signal, which is a signal corresponding to the operation of the first input device; a second input device configured to give input in a direction that is not limited to the vertical or horizontal direction through an operation thereof; second signal generation means for generating a second signal, which is a signal corresponding to the operation of the second input device; controller output means, which is connectable to the game machine input terminal, and is configured to output the keyboard control signal to the game machine input terminal; and a body part to which the first input device, the first signal generation means, the second input device, and the second signal generation means are mounted, which is configured to be grasped by one hand.

Further, the game machine controller has a control means mounted to the body part, and the control means is adapted to receive the first signal from the first signal generation means and is adapted to output the first signal from the controller output terminal as the keyboard control signal.

This game machine controller includes the body part configured to be grasped by one hand. The game machine controller includes the first input device configured to give input in the vertical or horizontal direction. Further, the game machine controller includes the first signal generation means for generating the first signal, which depends on the operation of the first input device. The first input device is, for example, a directional pad capable of giving input in the vertical or horizontal direction. The game machine controller includes the second input device configured to give input in the direction that is not limited to the vertical or horizontal direction. Further, the game machine controller includes the second signal generation means for generating the second signal, which depends on the operation of the second input device. The second input device is, for example, a stick input device. The user can operate the first input device and the second input device by the thumb under a state in which the body part is grasped.

The control means for receiving the first signal from the first signal generation means and outputting the first signal from the controller output terminal as the keyboard control signal is further mounted the body part includes. With this, the game machine controller can transmit the first signal generated through the operation of the first input device to the game machine as the keyboard control signal. In this way, the game machine, which has received the keyboard control signal, recognizes that the keyboard is connected, although the game machine controller is connected in actuality. This means that, in addition to the game machine controller of the subject application, the mouse can also be connected to the game machine allowing input from the keyboard and the mouse. As a result, the game machine can receive input in the vertical or horizontal direction corresponding to WASD input from the game machine controller of the subject application and receive input in a direction that is not limited to the vertical or horizontal direction from the mouse directly connected to the game machine without intervention of the game machine controller.

Now, a supplementary description is given of such effects.

In the related art, when a game machine controller is connected to a game machine, a controller control signal is output from the game machine controller to the game machine, and as a result, the game machine recognizes that the game machine controller is connected to the game machine. Further, in the related art, when a keyboard is connected to a game machine, a keyboard control signal is output from the keyboard to the game machine, and as a result, the game machine recognizes that the keyboard is connected to the game machine. The control means of the game machine controller of the subject application causes the controller output terminal to output a keyboard control signal as described above. As a result, the game machine recognizes that the keyboard and the mouse are connected to the game machine erroneously in a sense, although the game machine controller is connected to the game machine. This enables the game machine to recognize input in a direction that is not limited to the vertical or horizontal direction, which is output from the mouse.

In the game machine controller according to the subject application, the game machine controller further may have a mouse input terminal mounted to the body part, and the mouse input terminal may be adapted to receive a third signal, which is a signal corresponding to an operation of a predetermined mouse and generated by the predetermined mouse, the predetermined mouse being configured to give input in a direction that is not limited to the vertical or horizontal direction through the operation thereof.

In this case, the controller output terminal may be configured to output a selected one of the controller control signal and the keyboard control signal to the game machine input terminal.

Further, in this case, the control means may be configured to switch between a first mode and a second mode through selection by a user and may be configured to: receive the first signal from the first signal generation means; receive the third signal from the mouse input terminal; output the first signal from the controller output terminal as the keyboard control signal when the first mode is selected; and output the first signal and the third signal from the controller output terminal as the controller control signal when the second mode is selected.

As described above, the game machine controller of the subject application has, as its basic function, the function of outputting the first signal generated through the operation of the first input device from the controller output terminal as the keyboard control signal. This satisfies a certain desire of the user.

In this case, the user gives input in the vertical or horizontal direction through the first input device of the game machine controller, and gives input in a direction that is not limited to the vertical or horizontal direction through the mouse. However, some users desire to give input to the game machine under a state in which the game machine recognizes both of input from the first input device and input from the mouse as the controller control signal, namely, as input from the game machine controller with the purpose of avoiding, for example, a slight difference in timing of input.

With the control means described above, it is possible to selectively satisfy those two desires of the user. In the first mode, the basic function described above is implemented. In this case, the mouse is connected to the game machine separately from the game machine controller, that is, the mouse and the game machine controller are connected to the game machine independently. On the other hand, in the second mode, the latter desire of the user described above is satisfied. In this case, the mouse is connected to the game machine controller, and the game machine controller gives the first signal input from the first input device and the third signal input from the mouse to the game machine as the controller control signal. In the second mode, in short, the controller control signal output from the game machine controller may be the same signal as that output from the related-art game machine controller.

The control means may be configured to convert, when the second mode is selected and the keyboard control signal is to be output from the controller output terminal, the third signal received at the mouse input terminal into a signal that is the same as the second signal.

The inventors of the subject application also propose the following game machine controller set as one mode of the invention of the subject application.

The game machine controller set includes: any one of the above-mentioned game machine controllers; and a mouse, which is configured to give input in a direction that is not limited to a vertical or horizontal direction through an operation thereof, and is configured to: generate a third signal, which is a signal corresponding to the operation of the mouse; and output the third signal to the mouse input terminal.

In short, the game machine controller set is an integrated set of the game machine controller of the subject application and the mouse. The mouse may be prepared by the user depending on the preference of the user, but the game machine controller may be sold in a bundle with the mouse instead. Effects of the game machine controller set are the same as those of the game machine controller according to one embodiment of the invention of the subject application described above.

The inventors of the subject application also propose the following computer program as one mode of the invention of the subject application.

The game machine controller according to one embodiment of the invention of the subject application described above can be the same as the game machine controller described in the "Background Art" section at least in terms of hardware. The game machine controller according to one embodiment of the invention of the subject application and the related-art game machine controller are significantly different from each other in the control means of the invention in one embodiment of the subject application. The control means can be implemented by a piece of hardware, but may be implemented by a piece of software through installation of a computer program. Fortunately, the related-art game machine controller sometimes includes a computer (arithmetic device) and a recording device capable of installing a computer program to be executed by the computer.

With the computer program according to one embodiment of the invention of the subject application, the game machine controller described in the "Background Art" section and including a computer can be caused to function as the game machine controller according to one embodiment of the invention of the subject application. The computer program may not only be installed in an existing or sold game machine controller, but also may be installed in a game machine controller before shipment.

An example of the computer program is a computer program for a game machine controller to be used in combination with a game machine having a function of executing a game, the game machine including a game machine input terminal, the game machine being configured to selectively receive, by the game machine input terminal, as input for executing the game, any one of: a controller control signal, which is input from the game machine controller and is recognized as a signal from the game machine controller; and a keyboard control signal, which is input from a keyboard or a mouse and is recognized as a signal from the keyboard or the mouse, the game machine controller including: a first input device configured to give input in a vertical or horizontal direction through an operation thereof; first signal generation means for generating a first signal, which is a signal corresponding to the operation of the first input device; a second input device configured to give input in a direction that is not limited to the vertical or horizontal direction through an operation thereof; second signal generation means for generating a second signal, which is a signal corresponding to the operation of the second input device; a mouse input terminal configured to receive a third signal, which is a signal corresponding to an operation of a predetermined mouse and generated by the predetermined mouse, the predetermined mouse being configured to give input in a direction that is not limited to the vertical or horizontal direction through the operation thereof; controller output terminal, which is connectable to the game machine input terminal, and is configured to output the keyboard control signal to the game machine input terminal; and a body part to which the first input device, the first signal generation means, the second input device, the second signal generation means are mounted, and the mouse input terminal, which is configured to be grasped by one hand, the game machine controller further has a control means mounted to the body part, and the control means is adapted to receive the first signal from the first signal generation means, the second signal from the second signal generation means, and the third signal from the mouse input terminal, the control means is implemented by a computer, the computer program causing the computer to execute: processing of switching between a first mode and a second mode through selection by a user; processing of causing, when the first mode is selected, the controller output terminal to output the first signal as the keyboard control signal; and processing of causing, when the second mode is selected, the controller output terminal to output the first signal and the third signal as the controller control signal.

DESCRIPTION OF EMBODIMENTS

Now, a description is given of a preferred embodiment of the present invention with reference to the accompanying drawings.

Figure 1:
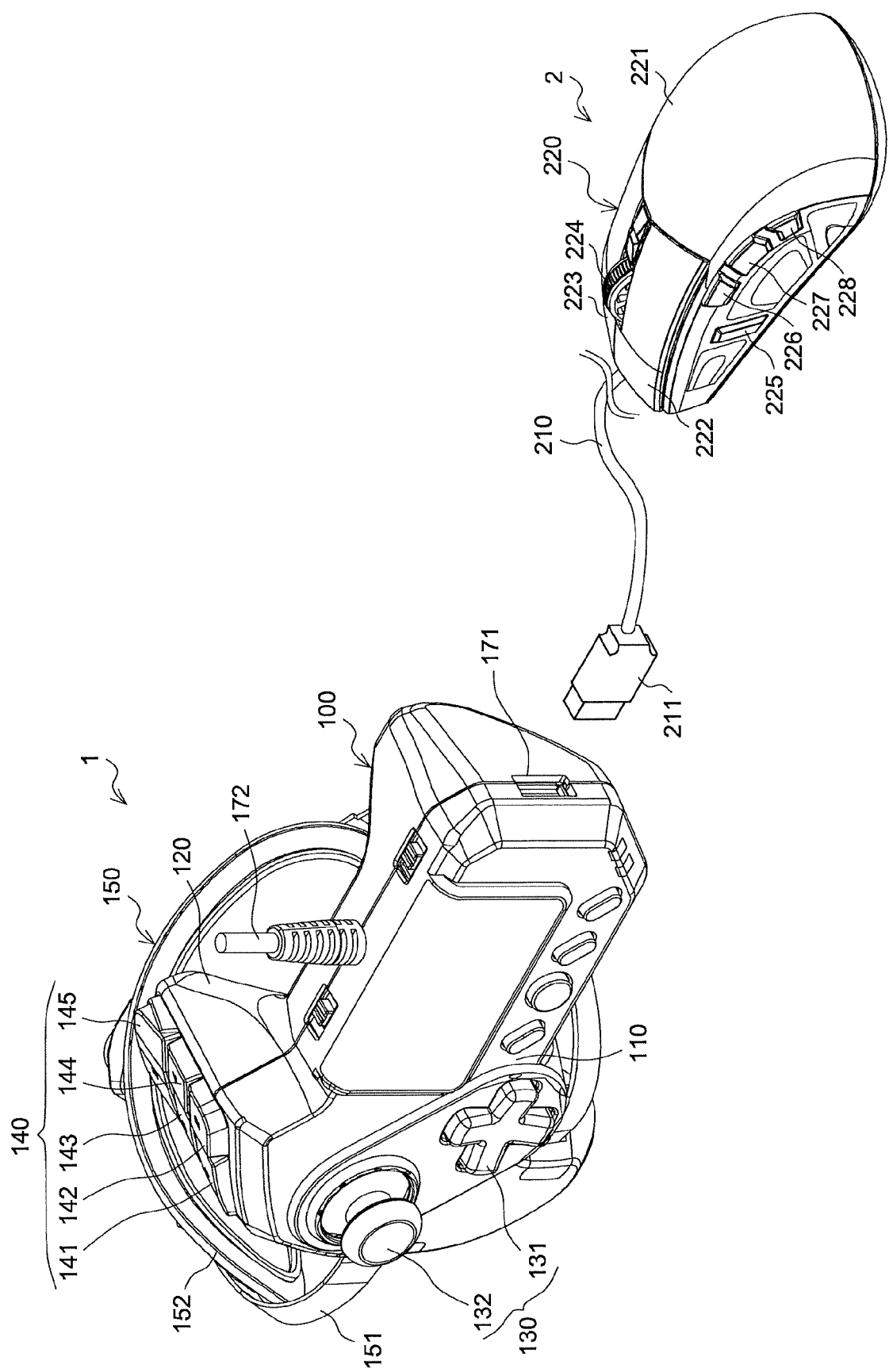
FIG. 1 is a perspective view of a game machine controller set in an embodiment of the present invention.
Figure 2:
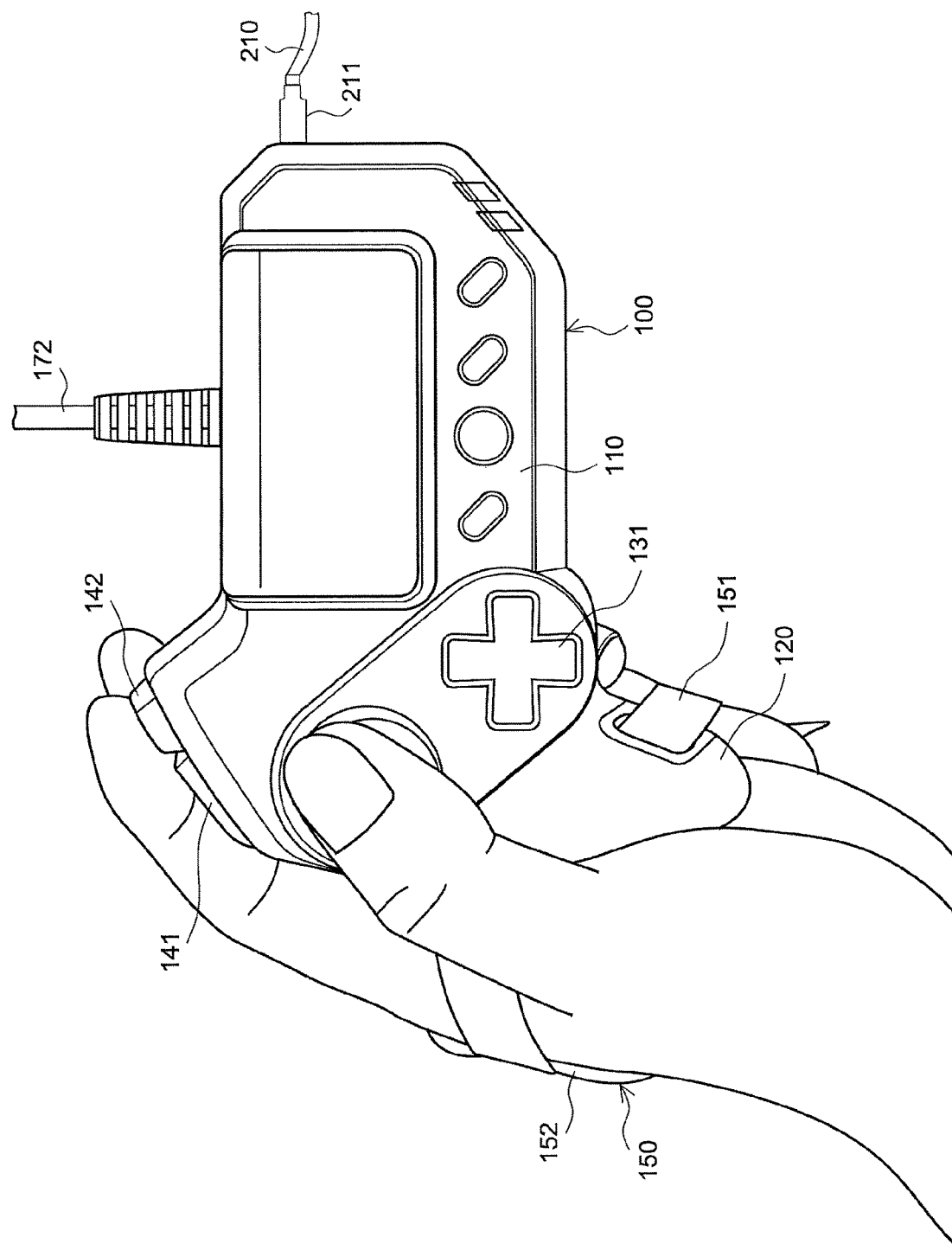
FIG. 2 is a front view of a situation in which a game machine controller illustrated in FIG. 1 is used.
Figure 3:
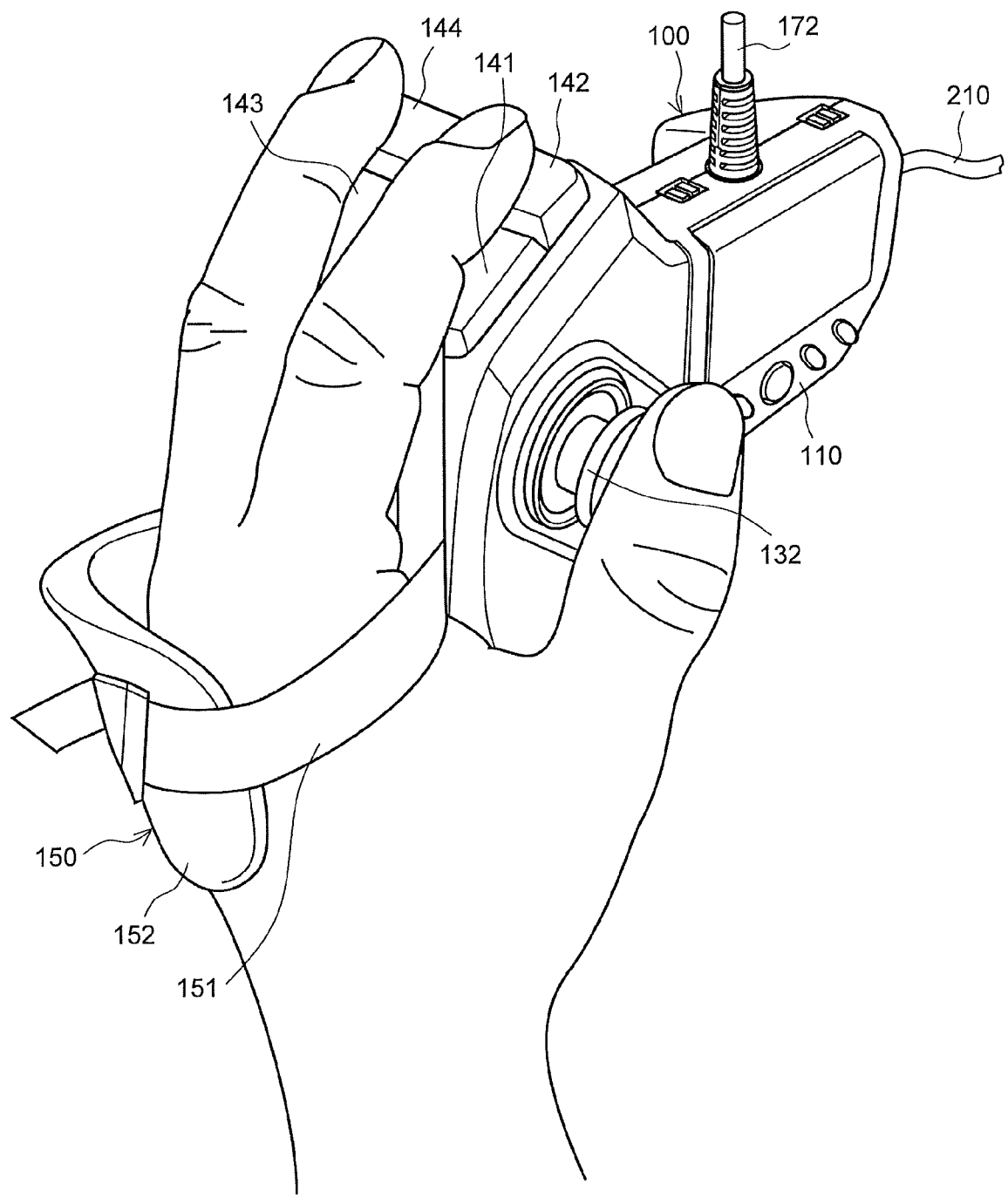
FIG. 3 is a perspective view of the situation in which the game machine controller illustrated in FIG. 1 is used.

FIG. 1 is a perspective view of a game machine controller set. Further, FIG. 2 and FIG. 3 are front and perspective views of a situation in which a game machine controller is used, respectively.

As illustrated in FIG. 1, the game machine controller set includes a combination of a game machine controller 1 and a mouse 2. The game machine controller 1 and the mouse 2 are used in combination to give input to a game machine.

Although not shown, the game machine is, for example, a game console, and is, for example, PlayStation 4 (trademark) manufactured and distributed by Sony Interactive Entertainment Inc. or Xbox One (trademark) manufactured and distributed by Microsoft Japan Co., Ltd. The game machine controller 1 is not limited to the one that gives input to the game console described above, and may be, for example, the one that gives input to a general-purpose personal computer serving as the game machine or that gives input to a handheld game console or a smartphone serving as the game machine. Devices that receive input are not limited to a game machine that is a game console, but it is assumed that the game machine controller 1 in this embodiment gives input to the game machine.

The game machine controller 1 in this embodiment is grasped and operated by one hand of the user. More specifically, the game machine controller 1 in this embodiment is grasped and operated by a left hand of the user. The game machine controller 1 may be the one that is grasped and operated by a right hand of the user as a matter of course. The game machine controller 1 in that case can be symmetric at least in appearance to the game machine controller 1 at a time when the game machine controller 1 is grasped and operated by the left hand of the user. When the game machine controller 1 is grasped by the right hand, the user operates the mouse 2 by the left hand, and when the game machine controller 1 is grasped by the left hand, the user operates the mouse 2 by the right hand.

As described in the "Background Art" section, the dominant design of a genuine controller in a game device includes an oblong body to be grasped by both hands, whose left half includes a directional pad allowing, for example, digital input, and a stick input device allowing, for example, analog input based on a tilt direction thereof, and whose right half includes four push buttons and such a stick input device as described above.

Roughly speaking, the game machine controller 1 in this embodiment can be said to be obtained by cutting the genuine controller described above in the middle of the body in half, setting only the left half thereof as a controller to be operated by the left hand, and attaching a band described below thereto.

The game machine controller 1 may have outer parts and parts (hardware) accommodated in a main body 100 described later that are constructed similarly to those of the related-art product. For example, outer parts and parts accommodated in the body of a game machine controller (product name: Tactical Assault Commander G1 for PS4/PS3/PC, "Tactical Assault Commander" and "Tactical Assault Commander G1" are trademarks) manufactured and distributed by the applicant of the subject application can also be used in the game machine controller 1 in the subject application.

Now, a detailed description thereof is given below.

The game machine controller 1 includes the main body 100. The main body 100 has a substantially rectangular shape in plan view. A front part 110 is a part on the front side of the main body 100 of FIG. 1, or a relatively wide planar part on the front side of FIG. 2. The front part 110 is a part that enters the field of view of the user when the game machine controller 1 is used, and has a substantially planar shape. The front part 110 may partially have a recess, or may have a totally smooth curved surface, for example. A substantially planar part that includes a first input device described later is the front part 110.

A grip 120 is provided on the left lower part of the main body 100 in FIG. 2. The grip 120 protrudes in a user direction at a time when the game machine controller 1 is used. In this embodiment, the grip 120 protrudes from the main body 100 in the user direction at the time when the game machine controller 1 is used under a state in which the grip 120 is inclined in an outer direction (direction of becoming away from median line of user) at the time when the game machine controller 1 is used and in a downward direction at the time when the game machine controller 1 is used, although the protruding direction is not limited thereto. The grip 120 is a part to be grasped by the left hand of the user. Specifically, the grip 120 has such a size and shape as to be capable of being grasped by a palm of the left hand and fingers excluding the thumb, or a size and shape that are appropriate for grasp in such a manner. Specifically, the grip 120 has substantially a circular section, and has a shape that gradually tapers from its based end to its edge.

The front part 110 of the main body 100 includes a main input part 130. The main input part 130 is an input device for giving input relating to a game. The main input part 130 is operated by the thumb of the left hand under a state in which the user grasps the grip 120 by the left hand. To enable this operation, the main input part 130 is provided in such a range as to be reached by the thumb of the user under a state in which the grip 120 is grasped by the left hand.

In this embodiment, the main input part 130 includes a directional pad 131 and a stick input device 132, although the configuration of the main input part 130 is not limited thereto. Of those, the directional pad 131 is indispensable in the invention of the subject application. Further, those components are both publicly known or well known.

The directional pad 131 is a cross-shaped key for giving input in the vertical or horizontal direction by pressing any one of upper, lower, left, and right end portions thereof, and more specifically, for example, is used for giving input of data (e.g., digital data) indicating a top, bottom, left, or right direction. The directional pad 131 is not required to have a cross shape as long as data indicating the up, down, left, or right direction can be input. For example, the directional pad 131 may be a combination of four push buttons arranged at positions of upper, lower, left, and right end portions, respectively.

The stick input device 132 is used to give input of data in a direction that is not limited to the vertical or horizontal direction based on a tilt direction thereof. More specifically, for example, the stick input device 132 is used to give input of data (e.g., analog data) indicating a certain direction (or direction and its inclination amount) within 360 degrees. The stick input device 132 has, for example, a stick shape. The stick input device 132 includes, at its end, an umbrella-shaped member for stably supporting a pulp of the thumb, although the configuration of the stick input device 132 is not limited thereto.

The game machine controller 1 in this embodiment includes a sub input part 140, although the configuration of the game machine controller 1 is not limited thereto. The sub input part 140 is arranged on a back of the main body 100, which is a part away from the user when the game machine controller 1 is used.

The sub input part 140 is an input device for giving input relating to a game. The sub input part 140 is assumed to be operated by the user grasping the grip 120 by at least one finger other than the thumb of the left hand. The sub input part 140 is provided at a position that enables such operation.

The sub input part 140 includes a plurality of operation portions, more specifically, five operation portions 141 to 145 in this embodiment, although the number of operation portions is not limited thereto. The user can operate each of the operation portions 141 to 145 to give input of a different meaning, although the configuration of the operation portions 141 to 145 is not limited thereto. The plurality of operation portions 141 to 145 are arranged in a vertical direction of the game machine controller 1 (vertical thickness direction of main body 100) at the time when the game machine controller 1 is used. Although not limited thereto, the operation portions 141 to 145 in this embodiment include the operation portion 141 and the operation portion 142 side by side in the first row, the operation portion 143 and the operation portion 144 side by side in the second row, and the operation portion 145 in the third row. The operation portion 141 and the operation portion 143 are aligned with each other in terms of width, the operation portion 142 and the operation portion 144 are aligned with each other in terms of width, and the operation portion 145 has a width substantially equal to a sum of the widths of the operation portion 141 and the operation portion 142 or a sum of the widths of the operation portion 143 and the operation portion 144. Among the operation portions 141 to 145, the operation portion 141 and the operation portion 142 are assumed to be operated by the index finger of the user, the operation portion 143 and the operation portion 144 are assumed to be operated by the middle finger of the user, and the operation portion 145 is assumed to be operated by the ring finger of the user, although the manner of operation depends on the preference of the user.

The operation portions 141 to 145 are each assumed to be a switch configured to give input by being pressed relative to the main body 100. For example, the genuine controller of PlayStation 4 manufactured and distributed by Sony Interactive Entertainment Inc. has push buttons (trigger switches) called R1, R2, L1, and L2 buttons on the back of its main body. The well-known or publicly-known configuration of push buttons can be employed for the operation portions 141 to 145.

Further, the game machine controller 1 includes a band 150. The band 150 has a belt shape. Both ends of the band 150 are attached near the root of the grip 120 in the main body 100 or the grip 120 of the game machine controller 1, and as a result, the band 150 itself, or a combination of the band 150 and a part of the surface of the main body 100 or the grip 120 forms a ring. The boundary between the main body 100 and the grip 120 is ambiguous in the first place, and both ends of the band 150 may be attached to any one of the main body 100 or the grip 120.

As illustrated in FIG. 2 and FIG. 3, the user can grasp the grip 120 by the left hand tied by the band 150. As a result, the game machine controller 1 is less likely to drop from the left hand of the user.

In this embodiment, both ends of the band 150 are attached to portions at the inner side (right side of FIG. 1) and outer side (left side of FIG. 1) of the grip 120, respectively. More specifically, both ends of the band 150 are attached to portions near the top of the grip 120.

Further, in this embodiment, the band 150 has a wider width at the middle position than at its ends, although the width is not limited to this configuration.

In this embodiment, the band 150 is formed of a band main body 151 and a band pad 152, although the configuration of the band 150 is not limited thereto. The band main body 151 has the same width over the entire length, and the band pad 152 has a wider width than that of the band main body 151 so that, in this embodiment, the band 150 has a wider width at the middle position than at its ends. The band main body 151 and the band pad 152 are not required to be separate members, and the band 150 can have a wider width at the middle position than at its ends.

The band pad 152 plays a role of stably fixing the left hand of the user to the game machine controller 1. The band pad 152 has a substantially elliptical shape so as to achieve its role, and is made of an appropriately thick cloth material into which a sponge member is inserted. The band main body 151 has a function of positioning the band pad 152 at an appropriate position in its length direction in addition to the function of fixing the left hand of the user to the game machine controller 1 by its entire length. That is, the user can slide the band pad 152 in the length direction of the band main body 151 to position the band pad 152 at an appropriate position. It is possible to fix the left hand of the user to the game machine controller 1 more stably by adjusting the position of the band pad 152 with respect to the band main body 151. The position of the band pad 152 with respect to the band main body 151 can be adjusted by two loop members (not shown) that have a loop shape by its ends provided on an outer side surface of the band pad 152 being fixed to the outer side surface of the band pad 152. The band main body 151 is caused to penetrate through the two loop members so that the band pad 152 is mounted to the band main body 151, and at the same time, the band pad 152 can move in the length direction of the band main body 151 with respect to the band main body 151. The loop members and the band main body 151 have an appropriate frictional resistance, which enable the band pad 152 to be positioned at any position in the length direction of the band main body 151.

A buckle (not shown) is provided at an appropriate position of the band main body 151 in this embodiment, although the configuration is not limited thereto. The buckle is used to adjust the entire length of the band main body 151. The size of the hand of the user is different for each user. It is possible to fix the left hand of the user to the game machine controller 1 more stably with the band 150 by enabling adjustment of the length of the band main body 151 and adjustment of the length of the band 150.

Further, a mouse input terminal 171 is provided in the main body 100 of the game machine controller 1. The mouse input terminal 171 is a terminal for receiving a third signal described later, which is generated by the mouse 2. The mouse input terminal 171 can be connected to a mouse output terminal described later, which is included in the mouse 2, and can be configured freely as long as the mouse input terminal 171 can receive a third signal. The mouse input terminal 171 in this embodiment is a USB terminal in consideration of its versatility, although the type of the mouse input terminal is not limited thereto.

Further, the output cable 172 is connected to the main body 100 of the game machine controller 1. A base end of the output cable 172 is connected to an interface described later, and a controller output terminal (not shown) is provided at the end of the output cable 172. The output cable 172 is used to selectively output a controller control signal and a keyboard control signal described later. The controller output terminal is an output terminal that can be connected to the game machine. The game machine is configured to receive the controller control signal and the keyboard control signal through connection of the controller output terminal to an input terminal provided in the game machine. The controller output terminal is only required to be capable of connecting to the input terminal provided in the game machine, and is assumed to conform to the standard of the input terminal provided in the game machine. The controller output terminal is a USB terminal, although the type of the controller output terminal is not limited thereto.

The main body 100 of the game machine controller 1 has an internal circuit board.

Figure 4:
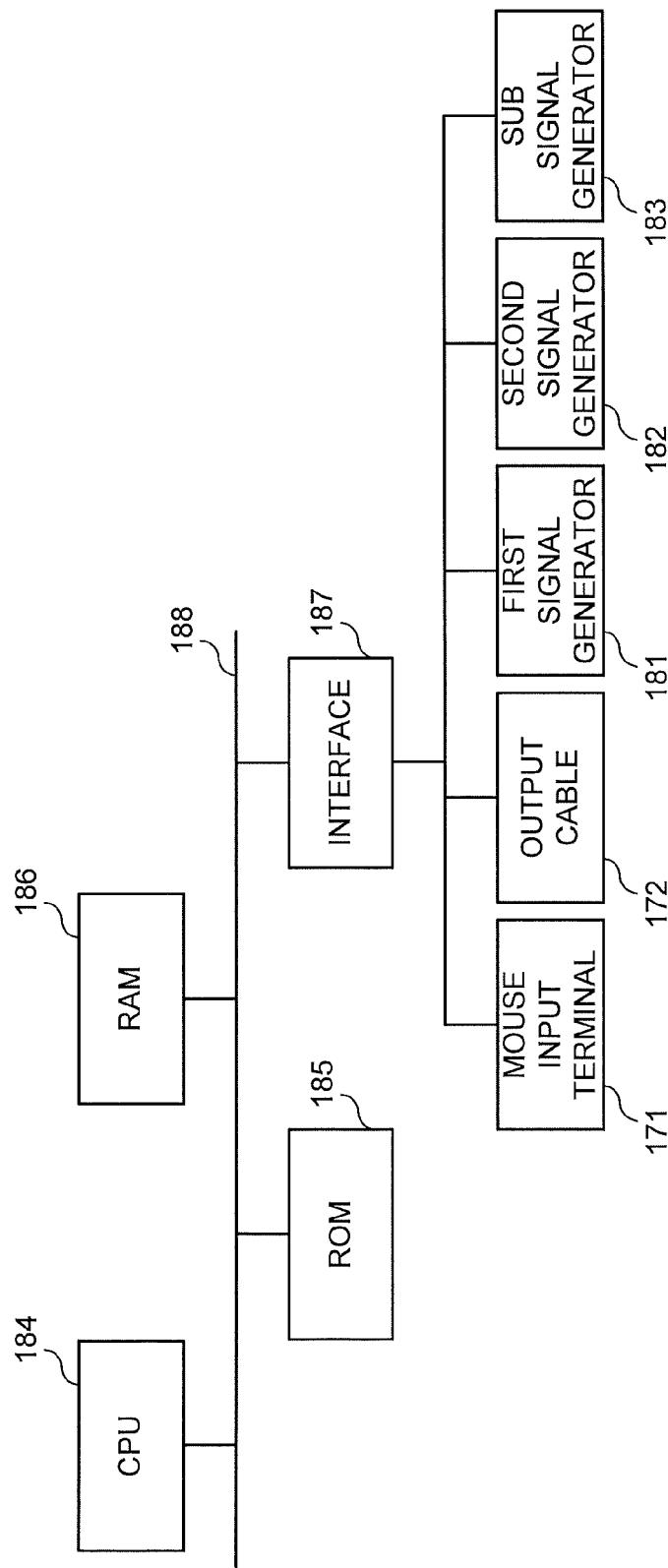
FIG. 4 is a configuration diagram of a circuit board included in the game machine controller illustrated in FIG. 1.

A schematic configuration of the circuit board is illustrated in FIG. 4.

The circuit board includes a first signal generator 181, which is a publicly-known or well-known generator, configured to generate a first signal that depends on an operation of the directional pad 131 of the main input part 130. The first signal generator 181 is in contact with the bottom surface of the directional pad 131, and when any one of the four end portions of the directional pad 131 is pressed, the first signal generator 181 senses pressing and generates a signal identifying which end portion is pressed.

The circuit board includes a second signal generator 182, which is a publicly-known or well-known generator, configured to generate a second signal that depends on an operation of the stick input device 132 of the main input part 130. The second signal generator 182 is connected to the bottom end of the stick input device 132, and senses in which direction and by what angle the stick input device 132 is inclined, and generates a second signal identifying the direction and amount of inclination of the stick input device 132.

Further, the circuit board includes a sub signal generator 183, which is a publicly-known or well-known generator, configured to generate a sub signal that depends on an operation of the sub input part 140. The sub signal generator 183 includes sensors corresponding to the respective five operation portions 141 to 145 provided in the sub input part 140, and the sub signal generator 183 generates a sub signal by the respective sensors sensing pressing of the operation portions 141 to 145.

In addition, the circuit board includes a central processing unit (CPU) 184, a read only memory (ROM) 185, a random access memory (RAM) 186, and an interface 187, which are connected to one another via a bus 188. Those components are also publicly known or well known as hardware components.

The CPU 184 is an arithmetic device configured to perform an arithmetic operation. The CPU 184 executes a computer program stored in, for example, the ROM 185 or the RAM 186 to execute processing described later.

The computer program herein at least includes a computer program for causing the game machine controller 1 (controller thereof described later) to function as the game machine controller according to the invention of the subject application. The computer program may be the one that is pre-installed in the game machine controller 1, or may be the one that is installed after shipment of the game machine controller 1. The computer program may be installed into the game machine controller 1 after shipment thereof via a predetermined medium, for example, a memory card, or may be installed via a network, for example, the Internet. The computer program may be transmitted from the game machine to the game machine controller 1 irrespective of whether the computer program is installed via a network.

The ROM 185 records a computer program or data required for the CPU 184 to execute processing described later.

The RAM 186 provides a work area required for the CPU 184 to perform processing.

The interface 187 exchanges data with external components such as the CPU 184 and the RAM 186, which are connected to the interface 187 via the bus 188. The above-mentioned mouse input terminal 171 and output cable 172 are connected to the interface 187, and further, the first signal generator 181, the second signal generator 182, and the sub signal generator 183 are connected to the interface 187. The interface 187 may receive a third signal from the mouse input terminal 171, a first signal from the first signal generator 181, a second signal from the second signal generator 182, and a sub signal from the sub signal generator 183. When those signals are received, the interface 187 transmits those signals to the bus 188. Meanwhile, the interface 187 may receive a controller control signal or a keyboard control signal from the bus 188. When those signals are received, the interface 187 transmits those signals to the game machine via the output cable 172.

In this embodiment, the game machine controller 1 outputs those pieces of data to the game machine in a wired manner via the output cable 172. However, those pieces of data may be output in a wireless manner by using, for example, a radio wave or light.

Figure 5:
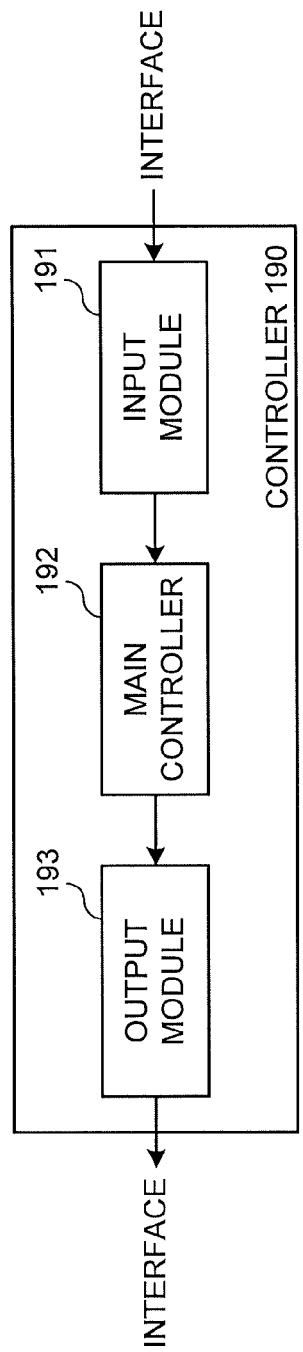
FIG. 5 is a block diagram for illustrating functions to be generated in the game machine controller illustrated in FIG. 1.

The CPU 184 executes the computer program so that a controller 190 illustrated in FIG. 5 is generated inside the game machine controller 1. The following functional blocks may be generated by functions of a single computer program described above for causing the game machine controller 1 to function as the game machine controller according to the invention of the subject application. However, those functional blocks may be generated by cooperation between the above-mentioned computer program and other computer programs, for example, the operating system (OS) installed in the game machine controller 1.

An input module 191, a main controller 192, and an output module 193 are generated in the controller 190.

The input module 191 receives input from the interface 187. The input module 191 may receive a third signal from the mouse input terminal 171, a first signal from the first signal generator 181, a second signal from the second signal generator 182, and a sub signal from the sub signal generator 183 via the interface 187. When the input module 191 receives those signals, the input module 191 transmits the signals to the main controller 192. Further, the input module 191 may receive switch data as described later, and when the input module 191 receives the switch data, the input module 191 also transmits the switch data to the main controller 192.

The main controller 192 plays a central role of the controller 190, and mainly executes data processing of the controller 190. There are mainly two functions of the main controller 192. The first function is switching of a first mode and a second mode. Although the first mode and the second mode are described in detail later, the main controller 192 performs such switching based on the switch data. Further, the second function of the main controller 192 is to generate a keyboard control signal and a controller control signal. The keyboard control signal and the controller control signal are generated during execution of the first mode and the second mode, respectively, and details of a method of generating the keyboard control signal and the controller control signal are described later.

In any case, the main controller 192 transmits a keyboard control signal and a controller control signal to the output module 193.

When the output module 193 receives a keyboard control signal from the main controller 192, the output module 193 transmits the keyboard control signal to the output cable 172 via the interface 187.

The mouse 2 in this embodiment is, for example, a commercially available general mouse, which is selected (purchased) depending on the preference of the user. Further, the mouse 2 may be an accessory of the game machine controller 1 sold together with the game machine controller 1.

Indispensable conditions on the mouse 2 in this embodiment are only the following. Specifically, the mouse 2 can generate, when the mouse 2 is moved on a surface, a third signal being data on a movement amount and movement direction of the mouse 2, includes a mouse cable 210 for outputting the generated third signal, and includes, at an end of the mouse cable 210, a standardized mouse output terminal 211 capable of connecting to both of the mouse input terminal 171, which is provided in the game machine controller 1, and is configured to receive a third signal, and an input terminal of the game machine configured to receive a third signal.

The third signal is data on movement in a direction that is not limited to the vertical or horizontal direction, and is, for example, data on movement in a direction within 360 degrees and a movement amount. A system for generating a third signal is publically known or well known, and thus an appropriate publically-known or well-known technology can be applied to the system. For example, the mouse 2 may be an optical mouse or a laser mouse.

Further, the mouse 2 includes the mouse output terminal 211 as described above. The mouse output terminal 211 can be connected to both of the input terminal of the game machine and the mouse input terminal 171 of the game machine controller 1. The mouse output terminal 211 is standardized to enable such connection.

As described above, it is indispensable for the mouse 2 to generate a third signal, but may input other data as in the case of a publicly-known or well-known mouse. The mouse 2 in this embodiment includes a left switch 222 and a right switch 223 for executing a so-called left click and right click, respectively, near the front end of a mouse cover 221 attached to a mouse body 220, and includes a wheel 224 for giving input through rotation, although the configuration of the mouse 2 is not limited thereto. Further, four push buttons 225 to 228 are arranged at positions of a left side surface of the mouse 2, which are easily operated by a thumb of the right hand in a case where the mouse is operated by the right hand, although the configuration of the mouse 2 is not limited thereto. The left switch 222, the right switch 223, the wheel 224, and the four push buttons 225 to 228 may or may not be assigned with appropriate input. Input to be assigned to those switches, wheel, and push buttons, and input to be assigned to the operation portions 141 to 145 of the game machine controller 1 may be appropriately determined by the user. Such a technology is also publically known or well known, and thus a description thereof is omitted here. When some input is assigned to the left switch 222, the right switch 223, the wheel 224, and the four push buttons 225 to 228, data generated through operations of those components can also be output from the mouse output terminal 211 via the mouse cable 210.

Next, a description is given of a method of using the game machine controller set including the game machine controller 1 and the mouse 2 described above, and an operation of the game machine controller set.

When the user uses the game machine controller set, the user first connects the controller output terminal (not shown) at the end of the output cable 172 of the game machine controller 1 to the input terminal included in the game machine.

After that, the user determines whether or not the game machine controller set is to be used in the first mode or second mode.

The first mode is a mode in which the game machine controller set is used under a state in which the game machine recognizes the game machine controller 1 as the keyboard, and the second mode is a mode in which the game machine controller set is used under a state in which the game machine recognizes the game machine controller 1 as the game machine controller.

Output from the game machine controller 1 serves as a keyboard control signal in the first mode, whereas output from the game machine controller 1 serves as a controller control signal in the second mode.

The user selects which of the first mode and the second mode the game machine controller 1 executes. The user may perform such selection through, for example, an operation of any one of the switches included in the game machine controller 1 (e.g., directional pad 131, stick input device 132, operation portions 141 to 145, or at least one of other switches), through an operation of a switch included in the mouse 2 (at least one of, for example, left switch 222 or right switch 223), via the game machine, or via other devices, for example, a smartphone. In this embodiment, the user can select the first mode by holding down the upper end portion of the directional pad 131 for five seconds or more, and can select the second mode by holding down the lower end portion of the directional pad 131 for five seconds or more, although the configuration of selection is not limited thereto. Data input through this selection is switch data.

The switch data is generated by the first signal generator 181 through an operation of the directional pad 131, and is input to the input module 191 of the controller 190 via the interface 187. The input module 191 transmits the switch data to the main controller 192, and the main controller 192, which has received the switch data, executes any one of the first mode and second mode selected based on the switch data.

Figure 6:
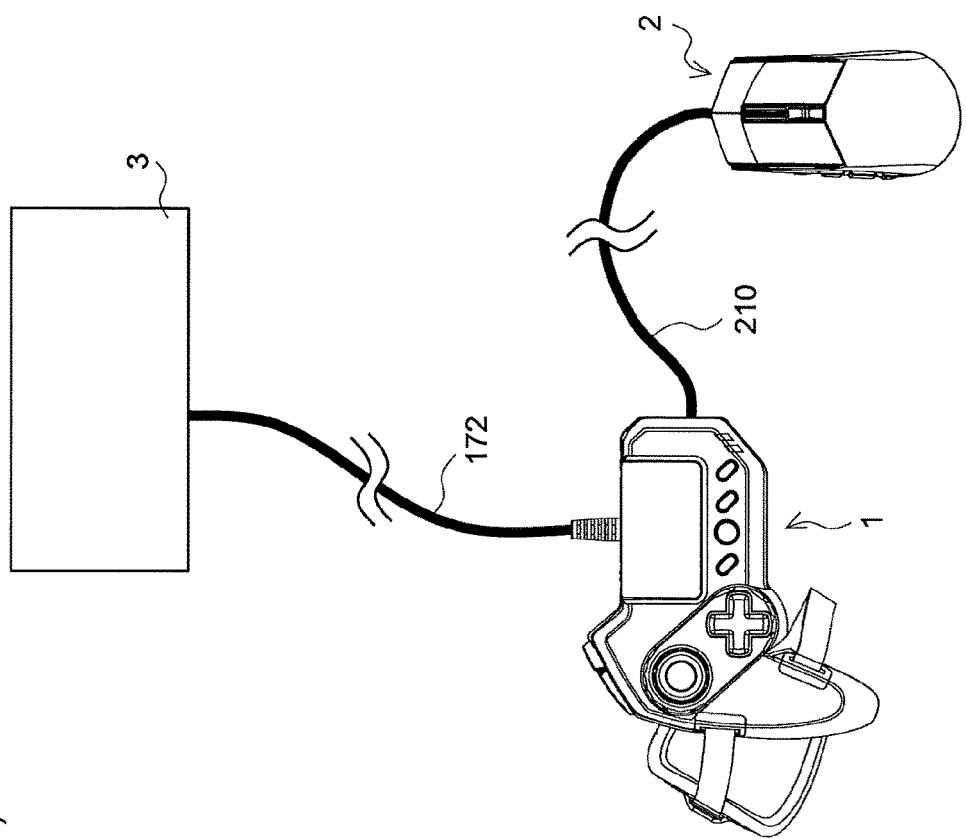
FIG. 6 are diagrams for schematically illustrating situations in which the game machine controller illustrated in FIG. 1 is used.
Figure 6:
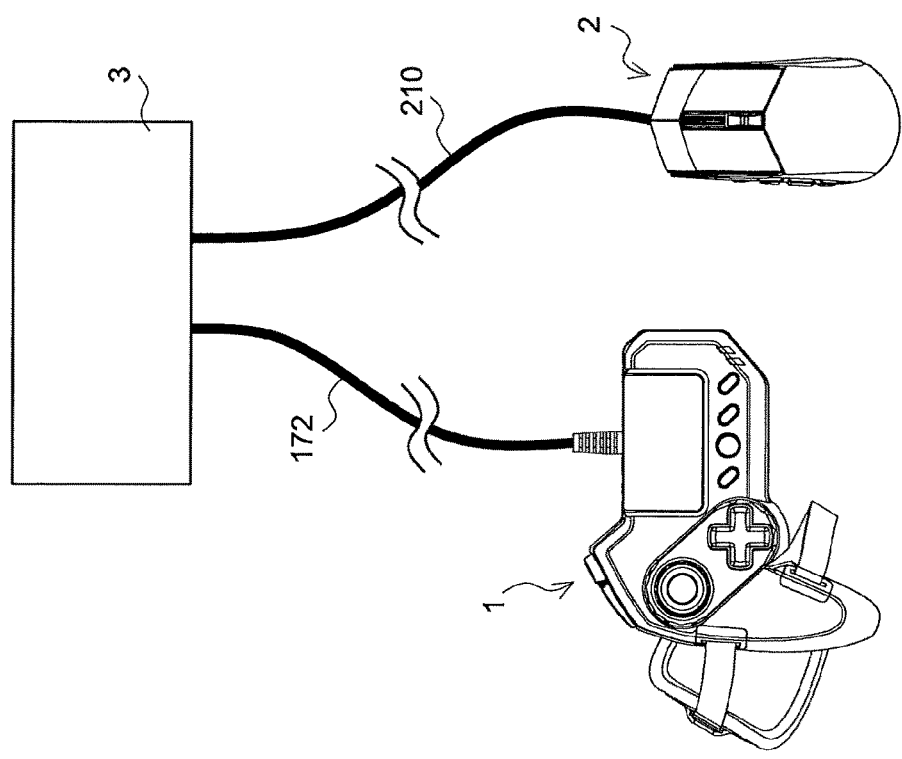

Now, a description is given of a case in which the first mode is selected in the main controller 192. In this case, the user connects the mouse output terminal 211 of the mouse 2 to the input terminal of the game machine. That is, as illustrated in FIG. 6(A), the game machine controller 1 and the mouse 2 are connected to the game machine 3 via the output cable 172 and the mouse cable 210, respectively, independently of each other.

Under this state, the user operates the game machine controller 1 by the left hand and the mouse 2 by the right hand.

When the user operates the directional pad 131 of the game machine controller 1, the first signal generator 181 generates a first signal that depends on this operation. Further, when the user operates the stick input device 132, the second signal generator 182 generates a second signal that depends on this operation. Further, when the user operates the sub input part 140, the sub signal generator 138 generates a sub signal that depends on this operation. Those first signal, second signal, and sub signal are all transmitted to the input module 191 of the controller 190 via the interface 187, and the input module 191 transmits those signals to the main controller 192.

The main controller 192 transmits those input signals to the output cable 172 via the interface 187 as a keyboard control signal that is the same as an output signal from a general keyboard. Specifically, when the first mode is selected, the main controller 192 stores, for example, several bytes of data as an input report format for the keyboard. As described above, the first signal, the second signal, and the sub signal are input to the main controller 192. The main controller 192 converts those signals into an output report format being data in units of one byte based on the input report format. The signal converted into the output report format is a keyboard control signal.

The game machine 3 receives the keyboard control signal via the output cable 172.

Meanwhile, when the user operates the mouse 2 (slides the mouse 2), a third signal is generated in the mouse 2. The third signal is transmitted from the mouse 2 to the game machine 3 via the mouse cable 210. The game machine, which has received the keyboard control signal, recognizes the game machine controller 1 as the keyboard, and thus the game machine can receive (or recognize) the third signal from the mouse 2. When the left switch 222 and the right switch 223 are operated, signals other than the third signal are generated, and those signals are transmitted from the mouse 2 to the game machine 3 via the mouse cable 210.

With this, the user can use the directional pad 131 of the game machine controller 1 to give input in the vertical or horizontal direction, and use the mouse 2 to give input in a direction that is not limited to the vertical or horizontal direction.

Now, a description is given of a case in which the second mode is selected in the main controller 192. In this case, the user connects the mouse output terminal 211 of the mouse 2 to the mouse input terminal 171. That is, as illustrated in FIG. 6(B), the game machine controller 1 is connected to the game machine 3 via the output cable 172, and the mouse 2 is connected to the game machine controller 1 via the mouse cable 210. In this case, only the game machine controller 1 is connected to the game machine 3.

Under this state, the user operates the game machine controller 1 by the left hand and the mouse 2 by the right hand.

When the user operates the directional pad 131 of the game machine controller 1, the first signal generator 181 generates a first signal that depends on this operation. Further, when the user operates the stick input device 132, the second signal generator 182 generates a second signal that depends on this operation. Further, when the user operates the sub input part 140, the sub signal generator 183 generates a sub signal that depends on this operation. Those first signal, second signal, and sub signal are all transmitted to the input module 191 of the controller 190 via the interface 187, and the input module 191 transmits those signals to the main controller 192.

Meanwhile, when the user operates (slides) the mouse 2, a third signal is generated in the mouse 2. The third signal is transmitted from the mouse 2 to the game machine controller 1 via the mouse cable 210, and the mouse input terminal 171 of the game machine controller 1 receives the third signal. When the left switch 222 and the right switch 223 are operated, signals other than the third signal are generated, and the mouse input terminal 171 of the game machine controller 1 receives those signals from the mouse 2 via the mouse cable 210. Those signals are also transmitted to the input module 191 of the controller 190 via the interface 187, and then to the main controller 192.

The main controller 192 receives the first signal, the second signal, the sub signal, the third signal, and other signals from the mouse 2. The main controller 192 transmits those input signals to the output cable 172 via the interface 187 as a controller control signal that is the same as an output signal from a general game machine controller. Specifically, when the second mode is selected, the main controller 192 stores, for example, several bytes of data as an input report format for the controller. As described above, the first signal, the second signal, and the sub signal are input to the main controller 192. The main controller 192 converts those signals into an output report format being data in units of one byte based on the input report format. The signal converted into the output report format is a controller control signal. At this time, the third signal generated in the mouse 2 may be converted into the same signal as the second signal generated by the second signal generator 182 through an operation of the stick input device 132 in the main controller 192. In this embodiment, the third signal generated in the mouse 2 is converted into the same signal as the second signal, although the signal is not necessarily converted. In other words, the main controller 192 can convert the third signal so that the output signal is the same between when the mouse 2 is operated and when the stick input device 132 is operated in a manner corresponding to the operation of the mouse 2.

The game machine 3 receives a controller control signal via the output cable 172.

The game machine 3 recognizes such a controller control signal as a signal output from one controller, that is, recognizes that the game machine controller is connected to the game machine 3.

With this, the user can use the directional pad 131 of the game machine controller 1 to give input in the vertical or horizontal direction, and use the mouse 2 to give input in a direction that is not limited to the vertical or horizontal direction.

In this embodiment, the game machine controller set is configured to select one mode from among the first mode and the second mode for execution. Instead, the game machine controller set may be able to execute only the first mode. In that case, the game machine controller 1 does not require the mouse input terminal 171.

REFERENCE SIGNS LIST 1 game machine controller
2 mouse
3 game machine
100 main body
110 front part
120 grip
130 main input part
131 directional pad
132 stick input device
140 sub input part
141 operation portion
142 operation portion
143 operation portion
144 operation portion
145 operation portion
150 band
171 mouse input terminal
172 output cable
181 first signal generator
182 second signal generator
183 sub signal generator
210 mouse cable

The invention claimed is:

1. A game machine controller to be used in combination with a game machine having a function of executing a game, the game machine including a game machine input terminal, the game machine being configured to selectively receive, by the game machine input terminal, as input for executing the game, any one of:
  a game machine controller control signal, which is input from the game machine controller, and is recognized by the game machine as a game machine controller control signal input from the game machine controller; and
  a keyboard control signal, which is input from a keyboard or a mouse, and is in a format recognized by the game machine as a keyboard control signal input from the keyboard or the mouse;
the game machine controller comprising:
  a main game machine controller body that is configured to be grasped by one hand,
  a first input device mounted on the main game machine controller body and configured to provide input in a vertical or horizontal direction through operation of the first input device;
  a first signal generator mounted on the main game machine controller body and configured for generating a first signal corresponding to the operation of the first input device;
  a second input device mounted on the main game machine controller body and configured to give input in a direction that is not limited to the vertical or horizontal direction through operation of the second input device;
  second signal generator mounted on the main game machine controller body and configured for generating a second signal corresponding to the operation of the second input device;
  a controller output terminal on the main game machine controller body that is connectable to the game machine input terminal of the game machine, and is configured to output the keyboard control signal to the game machine input terminal; and
  wherein the game machine controller further has a signal controller housed within the game machine controller body part, and the signal controller configured to receive the first signal from the first signal generator and to output the first signal from the controller output terminal in a format recognized by the game machine as the keyboard control signal.

2. The game machine controller according to claim 1, wherein the game machine controller further has a mouse input terminal mounted to the main game machine controller body, and the mouse input terminal configured to receive a third signal generated by a predetermined mouse according to the operation of the predetermined mouse, the predetermined mouse being configured to provide input in a direction that is not limited to the vertical or horizontal direction through the operation of the predetermined mouse, wherein the game machine controller output terminal on the main game machine controller body is configured to output to the game machine input terminal a selected one of a game machine control signal in a format recognized by the game machine as a game machine controller signal and a keyboard control signal in a format recognized by the game machine as the keyboard control signal wherein the game machine controller is configured to switch between a first mode and a second mode through selection by a user, and the game machine controller is configured to:
- receive the first signal from the first signal generator;
- receive the third signal from the mouse input terminal;
- output the first signal from the controller output terminal in a format recognized by the game machine as the keyboard control signal when the first mode is selected; and
- output the first signal and the third signal from the controller output terminal in a format recognized by the game machine as the game machine controller control signal when the second mode is selected.

3. The game machine controller according to claim 1, wherein the first input device mounted on the main game machine controller body includes a directional pad configured to provide input in the vertical or horizontal direction through operation of the directional pad.

4. The game machine controller according to claim 2, wherein the first input device mounted on the main game machine controller body includes a directional pad configured to provide input in the vertical or horizontal direction through operation of the directional pad.

5. The game machine controller according to claim 1, wherein when the second mode is selected and the keyboard control signal is to be output from the game machine controller output terminal, the signal controller is configured to convert the third signal received at the mouse input terminal into a signal that is the same as the second signal.

6. The game machine controller according to claim 2, wherein when the second mode is selected and the keyboard control signal is to be output from the game machine controller output terminal the signal controller is configured to convert the third signal received at the mouse input terminal into a signal that is the same as the second signal.

7. A game controller set comprising a game machine controller and a mouse to be used in combination with a game machine having a function of executing a game, the game machine including a game machine input terminal, the game machine being configured to selectively receive, by the game machine input terminal, as input for executing the game, any one of: a game machine controller control signal, which is input from the game machine controller, and is recognized by the game machine as a game machine controller control signal input from the game machine controller; and a keyboard control signal, which is input from a keyboard or a mouse, and is in a format recognized by the game machine as a keyboard control signal input from the mouse;
the game machine controller comprising: a main game machine controller body that is configured to be grasped by one hand,
a first input device mounted on the main game machine controller body and configured to provide input in a vertical or horizontal direction through operation of the first input device;
a first signal generator mounted on the main game machine controller body and configured for generating a first signal corresponding to the operation of the first input device;
a second input device mounted on the main game machine controller body and configured to give input in a direction that is not limited to the vertical or horizontal direction through operation of the second input device;
second signal generator mounted on the main game machine controller body and configured for generating a second signal corresponding to the operation of the second input device;
a controller output terminal on the main game machine controller body that is connectable to the game machine input terminal of the game machine, and is configured to output the keyboard control signal to the game machine input terminal; and
wherein the game machine controller further has a signal controller housed within the game machine controller body part, and the signal controller configured to receive the first signal from the first signal generator and to output the first signal from the controller output terminal in a format recognized by the game machine as the keyboard control signal;
wherein the mouse is configured to generate a third signal, which is a signal corresponding to the operation of the mouse and output the third signal;
wherein the game machine controller further has a mouse input terminal mounted to the main game machine controller body, and the mouse input terminal configured to receive the third signal output by the mouse;
wherein the game machine controller output terminal on the main game machine controller body is configured to output to the game machine input terminal a selected one of a game machine control signal in a format recognized by the game machine as a game machine controller signal and a keyboard control signal in a format recognized by the game machine as the keyboard control signal.

8. A game machine controller assembly for use in controlling a game machine having a function of executing a game, the game machine controller assembly including a signal controller for selectively outputting game machine control signals to allow two distinct modes of input, the game machine including a game machine input terminal, the game machine being configured to selectively receive, by the game machine input terminal, as input for executing the game, any one of:
a controller control signal input from the game machine controller, and recognized by the game machine as a signal from the game machine controller; and
a keyboard control signal input from a keyboard or a mouse, and recognized by the game machines as a signal from the keyboard or the mouse,
the game machine controller including:
a main game machine controller body that is configured to be grasped by one hand,
a first input device mounted on the main game machine controller body and configured to provide input in a vertical or horizontal direction through operation of the first input device;
a first signal generator mounted on the main game machine controller body and configured for generating a first signal corresponding to the operation of the first input device;
a second input device mounted on the main game machine controller body and configured to give input in a direction that is not limited to the vertical or horizontal direction through operation of the second input device;
second signal generator mounted on the main game machine controller body and configured for generating a second signal corresponding to the operation of the second input device;

a mouse input terminal mounted on the main game machine controller body and configured to receive a third signal corresponding to operation of a predetermined mouse, the predetermined mouse being configured to provide input in a direction that is not limited to the vertical or horizontal direction through the operation of the predetermined mouse;

a controller output terminal, that is connectable to the game machine input terminal, and configured to output a signal recognized by the game machine as the keyboard control signal to the game machine input terminal; and the signal controller housed within the main game machine controller body and adapted to receive the first signal from the first signal generation means, the second signal from the second signal generation means, and the third signal from the mouse input terminal, the signal controller configured to execute processing of switching between a first mode and a second mode through selection by a user wherein: when the first mode is selected, the controller output terminal outputs the first signal in a format that the game machine recognizes as the keyboard control signal; and when the second mode is selected, the controller output terminal outputs the first signal and the third signal as the machine controller control signal.

\* \* \* \* \*